US009262457B2

(12) United States Patent
Sharique et al.

(10) Patent No.: US 9,262,457 B2
(45) Date of Patent: Feb. 16, 2016

(54) ON-DEMAND HASH INDEX

(71) Applicants: Muhammed Sharique, Pune (IN); Anil Kumar Goel, Waterloo (CA); Mihnea Andrei, Issy les Moulineaux (FR); Rolando Blanco, Waterloo (CA); Harshada Chavan, Pune (IN)

(72) Inventors: Muhammed Sharique, Pune (IN); Anil Kumar Goel, Waterloo (CA); Mihnea Andrei, Issy les Moulineaux (FR); Rolando Blanco, Waterloo (CA); Harshada Chavan, Pune (IN)

(73) Assignee: Sybase, Inc., Dublin, CA (US)

( * ) Notice: Subject to any disclaimer, the term of this patent is extended or adjusted under 35 U.S.C. 154(b) by 238 days.

(21) Appl. No.: 13/965,552

(22) Filed: Aug. 13, 2013

(65) Prior Publication Data
US 2015/0052150 A1   Feb. 19, 2015

(51) Int. Cl.
*G06F 17/30*   (2006.01)

(52) U.S. Cl.
CPC .................. *G06F 17/3033* (2013.01)

(58) Field of Classification Search
None
See application file for complete search history.

(56) References Cited

U.S. PATENT DOCUMENTS

| | | | | |
|---|---|---|---|---|
| 5,404,510 | A * | 4/1995 | Smith | G06F 17/30598 |
| 6,275,919 | B1 * | 8/2001 | Johnson | G06F 17/30949 |
| | | | | 707/E17.036 |
| 6,599,210 | B1 * | 7/2003 | Takamori | F16H 55/30 |
| | | | | 474/152 |
| 7,672,928 | B2 * | 3/2010 | Maloney et al. | 707/715 |
| 9,059,989 | B2 * | 6/2015 | Kurkure | H04L 63/083 |
| 2004/0010488 | A1 * | 1/2004 | Chaudhuri et al. | 707/3 |
| 2005/0071331 | A1 * | 3/2005 | Gao et al. | 707/4 |
| 2005/0187917 | A1 * | 8/2005 | Lawande et al. | 707/3 |
| 2006/0069672 | A1 * | 3/2006 | Maloney et al. | 707/3 |
| 2009/0271366 | A1 * | 10/2009 | Ellison | G06F 17/30949 |
| 2010/0169293 | A1 * | 7/2010 | Gerber | G06F 17/30864 |
| | | | | 707/706 |
| 2011/0029507 | A1 * | 2/2011 | Au et al. | 707/714 |
| 2011/0153594 | A1 * | 6/2011 | Hagenbuch et al. | 707/718 |
| 2012/0197868 | A1 * | 8/2012 | Fauser | G06F 17/30286 |
| | | | | 707/714 |
| 2013/0173590 | A1 * | 7/2013 | Ghazal | 707/714 |

* cited by examiner

*Primary Examiner* — Hung Le
(74) *Attorney, Agent, or Firm* — Sterne, Kessler, Goldstein & Fox PLLC

(57) ABSTRACT

Disclosed herein are system, method, and computer program product embodiments for populating a hash index and returning a handle to the hash index. An embodiment operates by determining, by at least one processor, during query optimization that a first database query has a query execution plan comprising a sub-query which executes N times a correlated predicate having an operator being one of equal and not equal to a base column. A cost of creating and probing the hash index N times and a cost of fully scanning the base column N times are compared based on the correlated predicate. Based on the comparing, it is determined whether to create on-demand a hash index.

20 Claims, 5 Drawing Sheets

ON-DEMAND HASH INDEX

BACKGROUND

Certain types of database queries include sub-queries where a column may be scanned a large number of times. In situations which involve these sub-queries, the associated database query may suffer from performance degradation. Conventional techniques for reducing a number of column scans include maintaining a plurality of secondary indexes. However, maintenance of these secondary indexes can result in a serious performance impact on write operations because each write operation may need to update all of the secondary indexes. Thus, these conventional techniques burden database writing and are not feasible for use with, for example, a column store database having a row level versioned (RLV) architecture.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, method and/or computer program product embodiments, and/or combinations and sub-combinations thereof, for populating a hash index and returning a handle to the hash index.

Example Block Diagram of Database Architecture

Figure 1:
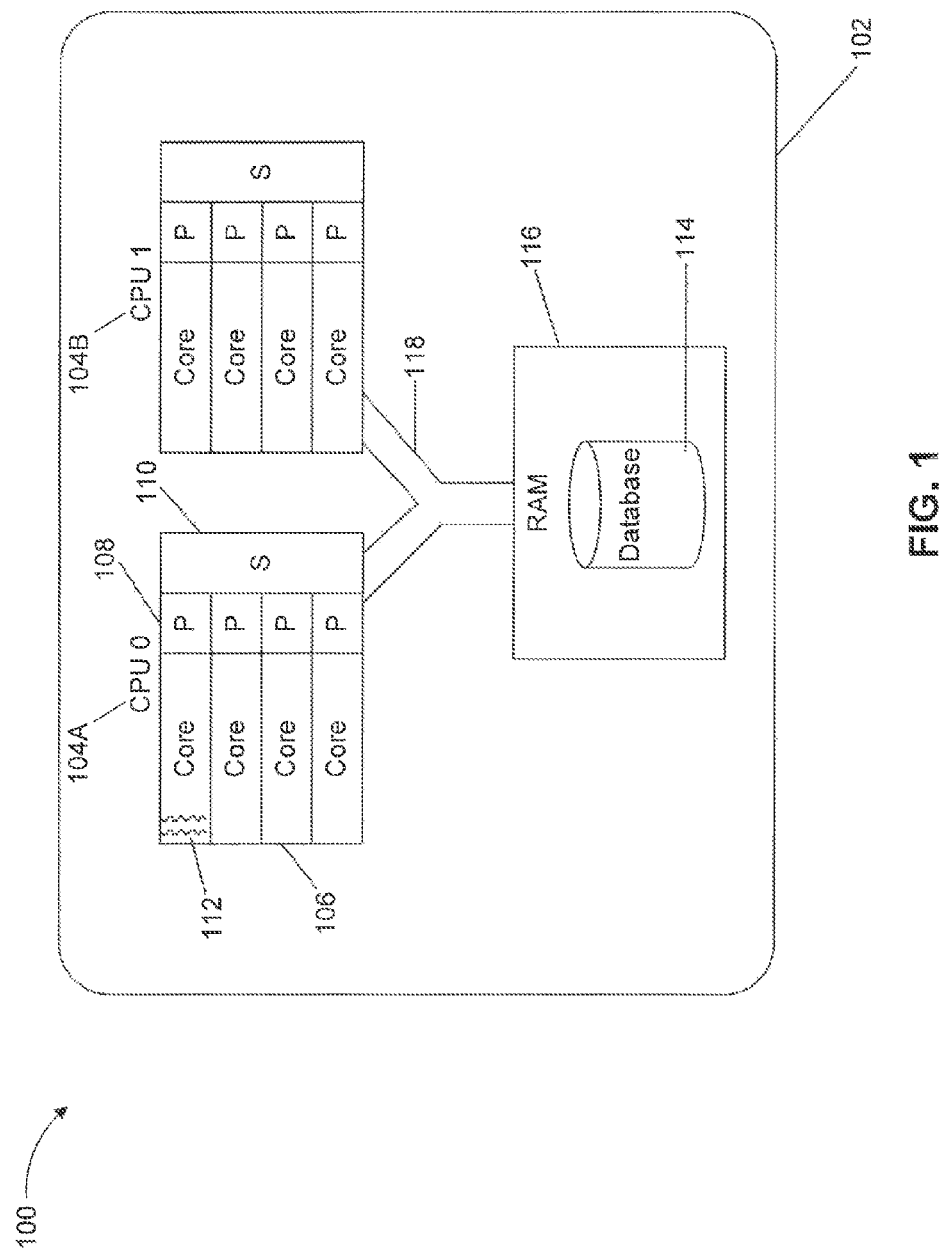
FIG. 1 is a block diagram of a database system, according to an example embodiment.

FIG. 1 shows a block diagram of a database system 100 according to an example embodiment. The database system 100 may be, but is not limited to, an in-memory database system. As shown in FIG. 1, database system 100 may include a computer 102 having at least one processor 104. As an example, the database system 100 in FIG. 1 is shown having two processors, but the database system is not limited to having two processors and may have a single processor or more than two processors. Each processor 104 may include a plurality of cores 106 each having a private cache 108. As an example, CPU 0 104A and CPU 1 104B in FIG. 1 are shown as having four cores 106 each, but the processors may include less than four cores or more than four cores. Each processor 104 may include caches 108 and cache 110 that is shared among its cores. Each core 106 may have a plurality of hardware contexts, e.g. threads 112. In addition, the computer 102 includes random-access memory (RAM) 110 which may include hundreds of GB or TBs of RAM. According to example embodiments, the database system 114 may be an in-memory column-store database system stored and executed within RAM 116. Thus, in an embodiment, as opposed to conventional database systems stored on disk where disk access and speed presents a bottleneck, the RAM 116 of an in-memory database system may present a bottleneck for the faster caches 108 and 110. The RAM 116 having the database system 114 and processors 104 may communicate via a bus 118.

According to an example embodiment, the database system 114 includes an in-memory intermediate store that is introduced in order to make write operations faster. An RLV enabled database table may include a fast projection index (flat FP index) on each of its columns. This flat FP index is a default index which is created when a table is created. All column values are stored in this default index. This default index is associated with each row in the table which enables certain kinds of search conditions to be evaluated. Each column may have one FP index, and each FP may be an array of n fixed-length entries being column values where n is the number of rows in the table. Each column value may then be stored sequentially in order. In order to keep write operations efficient, secondary indexes such as a hash index/btree index are typically not maintained or supported in an RLV store. Updating a secondary index during write operations would degrade write performance/efficiency of the store.

Processing Queries which Degrade Performance

Certain types of database queries may include sub-queries which involve scanning a column in a database an excessive number of times. According to example embodiments, if one of these database queries is detected, a hash index may be created for use with the instant query and then reused for subsequent queries, if applicable. The hash index is to be created by a reader of the database such that readers, not writers, pay the price of creating the index. This is beneficial in an RLV enabled table as index maintenance costs are offloaded to the readers, rather than burdening writers to the database. These costs may therefore be amortized over a plurality of readers of a same version of a database table. Detection of these database queries which may degrade performance may occur early in the optimization phase.

For example, a column may be scanned a large number of times if a database query includes correlated sub-queries. As a non-limiting example, a database query may be the following:

select*from outer where outer.c1 in(select inner.c1 from inner where inner.c1=outer.c1)

In this example, inner.c1 will be scanned for every value of outer.c1. While it is possible to only consider distinct values of outer.c1, if c1 is the primary key, there still may be a very high number of distinct values. If outer.c1 includes a million distinct values, then the inner query block will be executed a million times. For the above query, inner.c1=outer.c1 is a correlated predicate, where outer.c1 is an outer column, inner.c1 is an inner column, and "=" is an operator.

A query engine may conduct optimization on data. According to an embodiment, the query engine may sort data on outer.c1 such that all duplicates for a given unique value may sit next to each other in sorted data. Thus, for outer unique values, an inner query may be executed while outer duplicate values may use results generated by the unique value.

As an example, we may assume that outer.c1 includes the following values: b, a, c, a, c, c. After these values are sorted, they will be: a, a, b, c, c, c. An inner query may be executed for the first a, and a second a will use the result generated b the first a. Similarly, for an inner query for the first c, the second and third c may use the result generated by the first c. Thus, an inner query may only be executed for unique outer values. The inner query will only be executed three times for a, b, and c outer values.

As a further non-limiting example, the query may include a nested loop push down join query (NLPDJ):

select rvt.c1 from rvt1, rvt2 where rvt1.c1=rvt2.c1

In this example, the NLPDJ will likely cause an exorbitant number of column scans which take significant time and degrade performance. For the above query, rvt1.c1 is an inner column, and rvt2.c1 is an outer column.

According to an example embodiment, performance degradation may be alleviated by creating and utilizing a hash index on-demand. If the database system 114 detects one of the above example sub-query scans, the database system 114 may initiate creation of a hash index on a column in the database. This index may be made private to the database system 114 and will be unknown to a user accessing or writing to the database. The database system 114 will have ownership over creation and destruction of the index.

As a result, if the database system 114 detects a performance impairing query such as one of the examples provided above, and the database table is RLV enabled, the database system 114 may initiate creation of the index as described further in detail below.

Query scenarios including NLPDJ and correlated sub-queries may result in creation of the hash index when an operator in the correlated predicate is either equal or not-equal. After the index is created, it may be used for predicate evaluation. Once the query is completed, the index may be closed, however, once it is created the index may be used for multiple queries.

If a hash index is already created on a column by a correlated sub-query, this hash index can be utilized by any query using/working on the same version of the table.

According to an example embodiment, query Q1 creates a hash index on inner.c select*from outer where outer.c1 in(select inner.c1 from inner where inner.c1=outer.c1). For query Q2, the hash index created by Q1 can be reused even though it is not a correlated sub-query. As an example, query Q2 may be: select*from inner where inner.c=10.

However, there are instances where it may not be cost effective to create a hash index. According to an example embodiment, a cost model may compare the execution cost of the database query using the flat FP index with the cost of using the hash index. This cost model is described below. There may be situations where the cost of the creation of the hash index combined with the cost of probing the hash index may outweigh the column scans associated with use of the flat FP index. For example, the cost of using the hash index may be too high when there are very few rows in the inner and outer tables. In order to avoid creation of the index in such cases where the cost is too high, a cost model is used in order to determine whether the creation of the index may be beneficial.

Cost Model

In an embodiment, the cost model is based upon a number of equations and pseudocode, non-limiting examples of which are provided below.

Terms and Constants
innerRVTableCard=Cardinality of the inner table
innerRVColDistCard=Distinct count of the inner column
outerTableCard=Cardinality of the outer table
outerColDistCard=Distinct count of the outer column
CPU_factor=1.1;
Additional_Overhead=0;
Memory_Factor=1;
Hash_Insert_Factor=1.01;
// Note that the above values are based on experiments to verify functionality of the Cost Model Equations & Pseudocode for Cost Model
// Compute the cost of using the Flat FP index
// Begin equations & pseudocode
costWithFlatFP = outerColDistCard * (innerRVTableCard * (CPU_Factor * Cell_Size));
// Compute the cost of creating and probing the Hash Index
Memory_Allocated_For_Keys = 8 * innerRVTableDistCard;
if (TableCard / ColDistCard == 1) {
    Memory_Allocated_For_Values =innerRVColDistCard * (40 bytes + 8);
    // rowid found
}
else if (TableCard / ColDistCard < 128) {
    Memory_Allocated_For_Values = innerRVColDistCard * (40 bytes + 8 * 128);
    // array of rowids
}
else {
    Memory_Allocated_For_Values = innerRVColDistCard * (40 bytes + (TableCard/ColDistCard/NumBitsPerChunk) * (52 + NumBitsPerChunk/8));
    // bitmap of rowids
}
Approximate_Memory_Allocated = Memory_Allocated_For_Keys + Memory_Allocated_For_Values + Additional_Overhead;
Memory_Cost = Approximate_Memory_Allocated * Memory_Factor;
Column_Scan_Cost_Of_The_Inner_Table = innerRVTableCard * CPU_Factor * Cell_Size;
Hash_Creation_Cost = (Column_Scan_Cost_Of_The_Inner_Table * Hash_Insert_Factor) + Memory_Cost;
Hash_Probe_Cost = outerTableDistCard * CPU_Factor;
// The hash probe cost is the cost of computing the hash value for each distinct outer value
// + cost of walking array of size 4 + the cost of one comparison
costWithHashIndex = Hash_Creation_Cost + Hash_Probe_Cost;
// End equations & pseudocode When determining how much memory to allocate, values may be accepted in order to estimate how many unique data values in the column are expected. These estimates may assist in avoiding underallocating or overallocating memory and avoiding allocation cost. However, if the estimates are not accurate, the database system is able to dynamically reallocate memory.

In view of the above equations and pseudocode, the cost model may be used in order to determine whether to create the hash index. Therefore, the hash index may be created only if costWithHashIndex<costWithFlatFP. However, as further described below; the Hash_Creation_Cost will be 0 as long as the hash index has already been created.

Hash Index Creation

Figure 2:
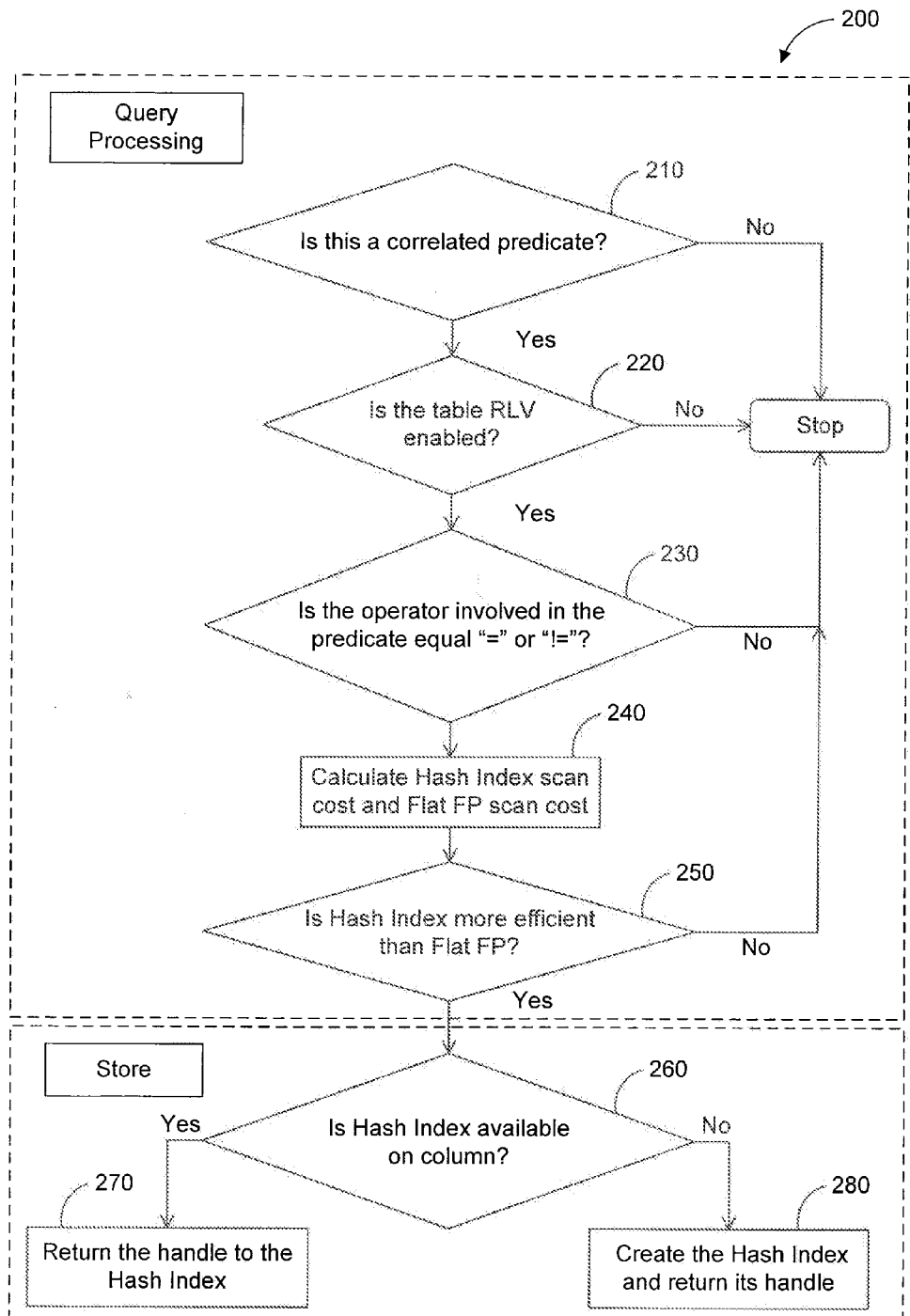
FIG. 2 is a flowchart illustrating checks before a hash index is created on-demand, according to an example embodiment.

According to an embodiment, FIG. 2 shows a flowchart 200 illustrating a process of hash index creation. In step 210, during query optimization when a query is determined to be a query that overscans and causes performance degradation, for every outer reference in the query block, it is determined whether a correlated predicate is found to be present. If a correlated predicate is not present, then the process stops because a hash index is not needed and is not created.

In step 220, if a correlated predicate is found, then it is determined whether the table is RLV enabled. If the table is not RLV enabled, then the process stops because a hash index is not needed and is not created.

In step 230, if the table is RLV enabled, then it is determined whether the operator involved in the correlated predicate is equal ("=") or not equal ("!="). If the operator involved in the correlated predicate is not one of these operators, then a hash index is not needed and is not created.

In step 240, if the operator is equal or not equal, the cost of creating a hash index and the cost of a flat FP scan is computed as described above. If the cost of the hash index is determined to be less than the cost of the flat FP scan, then a hash index is not needed and is not created.

In step 250, if creating/probing the hash index is determined to be an efficient use of resources and less than the cost of a flat FP scan, then it is determined whether a hash index has already been created.

In step 260, if the hash index has already been created, a handle to the hash index is returned in step 270 and the process ends.

In step 260, if the hash index has not yet been created, then in step 280 the hash index is created and a handle to the hash index is returned.

If the index is being created and populated by another query, query processing waits for the index to be populated and both (or more) waiting queries may re-use the index. Hence, at most one hash index is created for each specific version of the table. A first query that finds the query index beneficial creates the index, and other concurrent queries get blocked and wait until the first query completes the creation and population of the index.

According to an example embodiment, and as shown in FIG. 2, during query processing and depending upon the type of query being processed, if evaluation of the hash index cost model for the column is determined to be lower than the cost of scanning using the flat FP index; then the hash index is created and populated if it does not yet exist. A handle is then returned to the hash index. If the hash index is determined to be more cost effective and has already been populated, then a handle to the hash index is returned.

Index Creation and Maintenance

Each hash index may include a hash table that is created according to the process described herein. This hash table associates column values with rows. As an example, given a set of rows associated with a particular version of the table, the hash index for a column of the table may include as many entries as different values are in the column that are being indexed for the set of rows. Each value in the hash table may be associated with a row position(s) in the table and a particular value in the column. The column store is implemented as an append-only column store, e.g., no data is deleted from the store. Thus, instead of copying each different value into the hash table, a pointer is associated with a first occurrence of a value in the column as determined by the rows in the table version.

In other words, each element of the hash table includes a pointer to a data value, and a row specification. The row specification is described further herein, but may be a rowid, an array of rowids, or a bitmap of rowids. In other words, the row specification may be a rowid (e.g. a position of the row in the table) if only one row has the value, an array of rowids if a plurality of the rows have the value (e.g. 100 rows have the same value such as "M" or "F" and the array has a capacity of 128), or a bitmap if more rows than can fit in the array have the value of "M" or "F." The capacity of the array provided here is merely an example, and may he a value that is higher or lower than 128.

Lifetime of the Index

Each hash index is associated to a table version that is assigned to the transaction that triggered hash index creation. In other words, a particular hash index is only available to transactions which use a same table version which the hash index is associated with.

Populating a Hash Index

Figure 3:
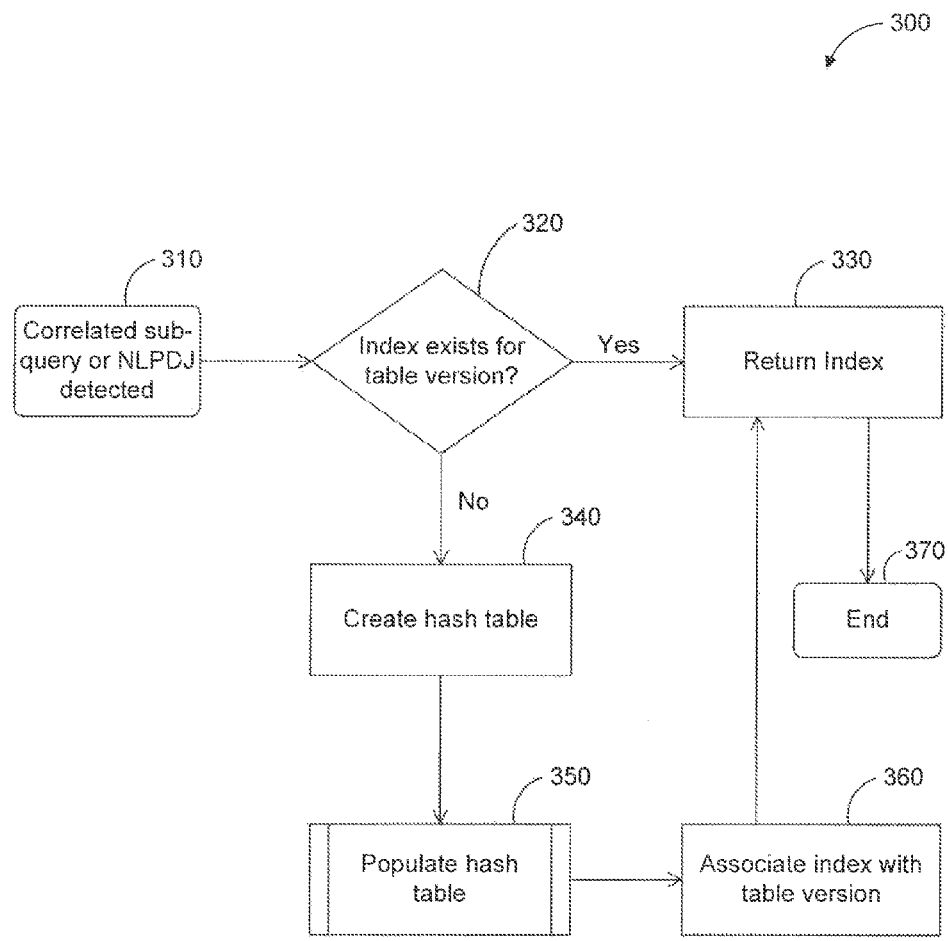
FIG. 3 is a flowchart illustrating returning of a hash index, according to an example embodiment.
Figure 4:
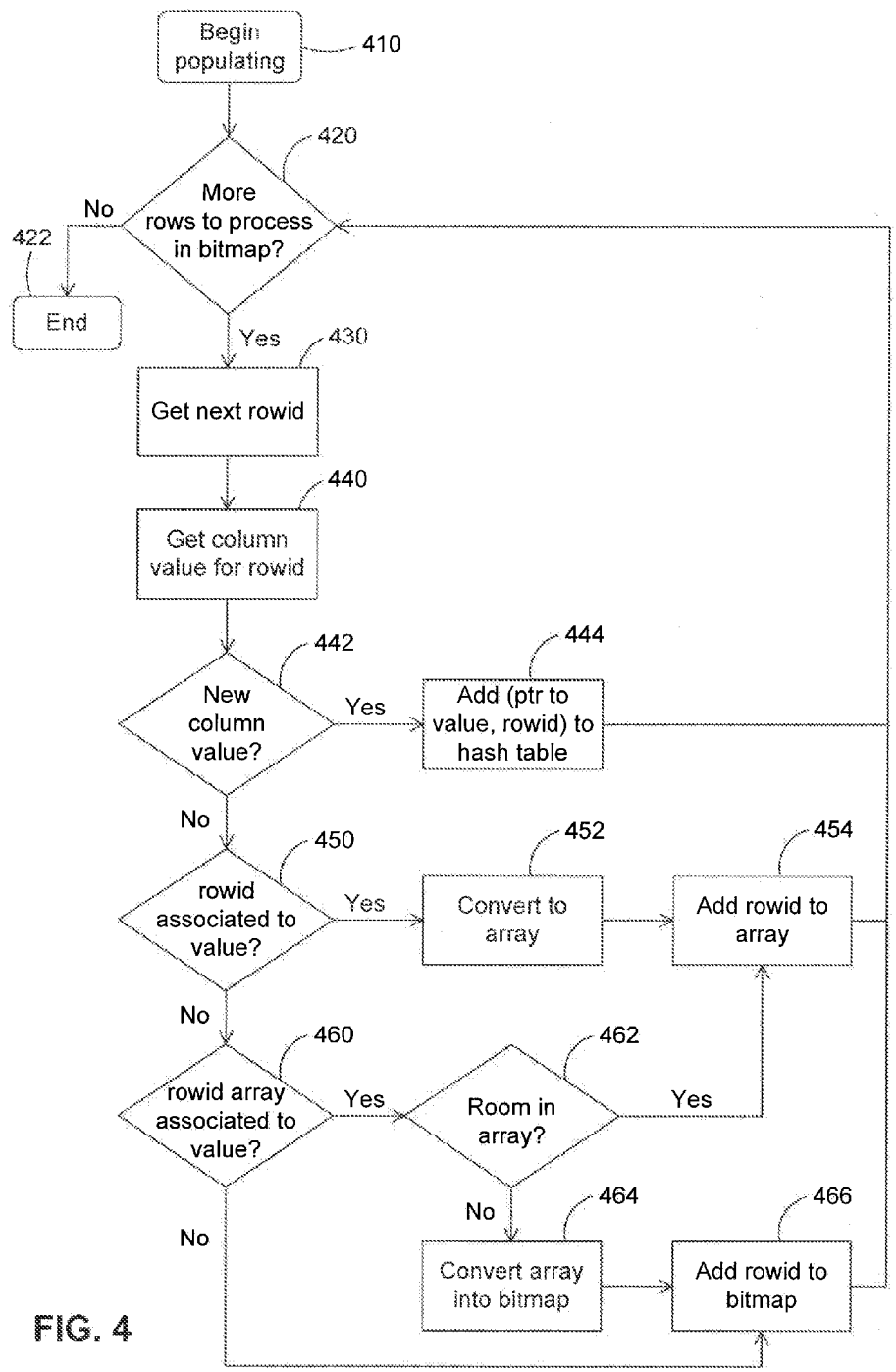
FIG. 4 is a flowchart illustrating populating a hash table, according to an example embodiment.

According to an embodiment, FIGS. 3 and 4 show flowcharts illustrating a process of returning and populating a hash index if its use is determined to be cost effective. First, a column that is being indexed is scanned by walking the values in the column. Rows in the column associated with the table version are retrieved during the scan by utilizing an existence bitmap that is associated with the table version. The existence bitmap of the table version is used to identify a sequence of rowids that are enumerated by position in the table. The enumerated rows that are included in the existence bitmap are rows in the table which are included in this particular table version.

Therefore, using the existence bitmap, based on the column value for each row in the table version, the hash index is populated. When a new column value is identified during the scan of the column, a pointer to the value is added to the hash table along with the rowid of the row that contains the value. Later during the scan, if another row is determined to have the same value, then an array of rowids is associated to the value in the hash table. If the array becomes full during the scan of the column, then a bitmap may be created to refer to all rowids associated with a particular value. The rowids which are in the array are inserted into the bitmap, the bitmap is associated to the column value in the hash table, and the array is discarded (deallocated).

Once all database transactions using the table version are complete, and a more recent version of the table exists, the hash index is discarded (deallocated) along with the table version.

FIG. 3 shows a process 300 of returning a hash index according to an example embodiment. In step 310, the process begins when a database query having a correlated subquery or an NLPDJ is detected by the query optimizer.

In step 320, it is determined whether an index already exists for a particular table version.

In step 330, if the index already exists for the table version, then the index is returned and the process of populating the hash index ends in step 370.

In step 340, if the index does not yet exist, a hash table is created. In step 350, after the hash table is created it is populated, which is described in detail below.

In step 360, the index is associated with the particular table version and the index is returned in step 330.

In step 370, the process of returning the hash index ends.

FIG. 4 shows a process of populating the hash table in detail according to an example embodiment. Thus, FIG. 4 includes the details of populating the hash table in step 350 shown in FIG. 3 and may be viewed as a loop.

In step 410, the process of populating the hash table in step 350 begins.

In step 420, the process enters a loop that is executed while there are additional rows to process in the existence bitmap for the table version.

In particular, in step 420, if it is determined that there are additional rows to process, then the process moves onto step 430 where the value associated with the next rowid is retrieved.

However, if there are no additional rows to process in the bitmap, then the process of populating the hash table ends in step 422.

After the next rowid is determined using the existence bitmap in step 430, the column value is retrieved for the rowid in step 440.

If this column value is determined to be a new value in step 442, then in step 444 a new pair is added to the hash table including a pointer to the column value and the associated row id.

However, if the column value is not a new value, then it is determined whether another rowid is already associated with the value in step 450. If another rowid is already associated with the value, then in step 452, the rowid in the hash table is converted into an array and the rowid is inserted into the array. The second rowid is inserted into the array in step 454.

If the column value is not a new value (step 442) and it is determined that a rowid array is already associated with the value (step 450), then it is determined whether there is an associated array in step 460. If there is an associated array, then in step 462, it is determined whether there is room in the array. If it is determined that there is additional room in the array, then the rowid is added to the array in step 454. However, if the array is full, then in step 464 the array is converted into a bitmap and all rowids in the array are added to the bitmap. The new rowid is added to the bitmap in step 466.

If the column value is not a new value and it is determined that a rowid array is not associated with the value, then it is determined whether there is an associated bitmap in step 460. If there is an associated bitmap, then the rowid is added to the bitmap in step 466.

According to an example embodiment, the hash index is an insert only index. Thus, since nothing can be deleted, a bitmap cannot be reduced to an array, and an array cannot be reduced to a single rowid. The hash table may be populated using pointers to a value associated with rowids by using a variety of data structures. Each entry into the hash table may include (1) a pointer to a value/rowid, (2) a pointer to a value/array of rowids or (3) a pointer to a value/bitmap of rowids to address diversity in the data in the table. Thus, the hash table is able to represent data found throughout a high percentage of the rows, some of the rows, or even only one of the rows.

Analysis of On-Demand Hash Index

The on-demand hash index was analyzed by conducting experiments in order to test the veracity of the cost model and gain in performance using the hash index. Experiments were conducted using database system 114 as described above.

According to an example embodiment, tables in the database system were RLV enabled having one column (c1) with all data stored in main memory (RLV only data). A distinct count of the inner column was hard coded to be 100. Each experiment described herein was conducted ten times and an average value in milliseconds was computed for each.

Parameter Values
CPU_Factor=1.1
Additional_Overhead=0
Memory_Factor=1
Hash_Insert_Factor=1.01
Sample Queries
Experiment1: select*from R100D100 where R100D100.c1 in(select R1KD100.c1 from R1KD100 where R1KD100.c1=R100D100.c1)–Gain 0.57%, No Hash Index
Experiment2: select*from R1KD100 where R1KD100.c1 in(select R100D100.c1 from R100D100 where R1KD100.c1=R100D100.c1)–Gain 15.38%, Hash Index created Experiment3: select*from R100D100 where R100D100.c1 in(select R10KD100.c1 from R10KD100 where R10KD100.c1=R100D100.c1)–Gain 32.69%, Hash Index created Experiment4: select*from R10KD100 where R10KD100.c1 in(select R100D100.c1 from R100D100 where R10KD100.c1=R100D100.c1)–Gain 11%, Hash Index created Experiment5: select*from R100D100 where R100D100.c1 in(select R1MD100.c1 from R1MD100 where R1MD100.c1=R100D100.c1)–Gain 53.62%, Hash Index created Experiment6: select*from R5D5 where R5D5.c1 in(select R1MD100.c1 from R1MD100 where R1MD100.c1=R5D5.c1)–Gain 21.55%, Hash Index created Experiment7: select*from R5D5 where R5D5.c1 in(select R100D100.c1 from R100D100 where R5D5.c1=R100D100.c1)–Gain −5.11%, No Hash Index Results

| Experiment # | #RowsOuterTable * #RowsInnerTable | Execution Time with Flat FP Index (msec) | Execution Time with Hash Index (msec) | % Gain | Hash Index Created (Based on Cost Model Decision) |
|---|---|---|---|---|---|
| 1 | 100 * 1000 | 245.3 | 243.9 | 0.57 | No |
| 2 | 1000 * 100 | 1554.5 | 1315.3 | 15.38 | Yes |
| 3 | 100 * 10000 | 363.1 | 244.4 | 32.69 | Yes |
| 4 | 10000 * 100 | 14561.3 | 12853.9 | 11 | Yes |
| 5 | 100 * 1000000 | 10228.3 | 4743.8 | 53.62 | Yes |
| 6 | 5 * 1000000 | 765.1 | 592.5 | 22.55 | Yes |
| 7 | 5 * 100 | 70.3 | 74.6 | −6.11 | No |

According to the above described experiments based on the example embodiments, for tables having a fewer number of rows, memory overhead for creation of the hash index will overshadow any performance benefits (e.g. as seen in Experiments 1 and 7). However, as the number of rows increase, the performance gain resulting from use of the hash index increases. In conclusion, the cost model favors use of the hash index if it is more efficient than the that FP index when taking all costs into consideration.

Example Computer System

Figure 5:
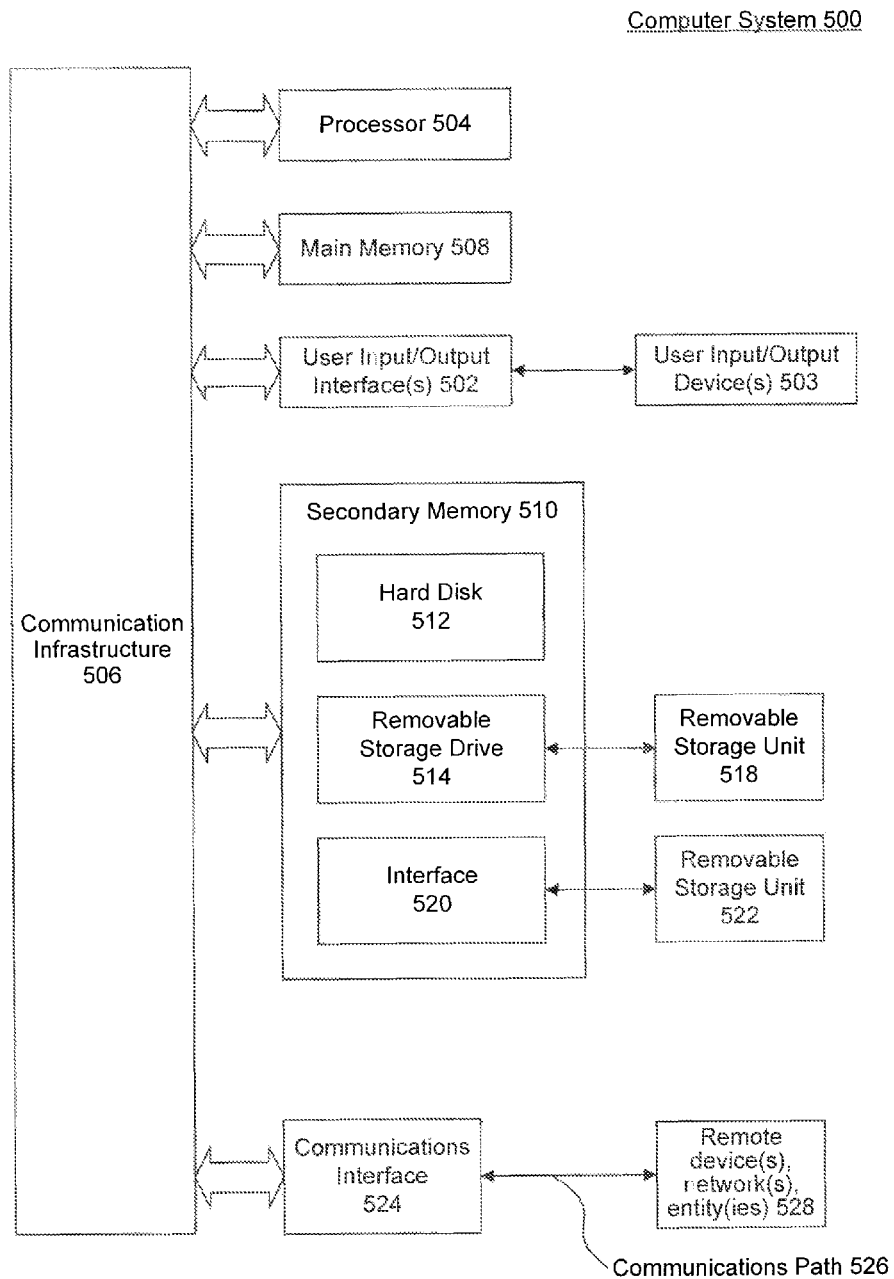
FIG. 5 is an example computer system useful for implementing various embodiments.

Various embodiments can be implemented, for example, using one or more web-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for creating a hash index on-demand and reusing the hash index for queries in a database, comprising:
    determining, by at least one processor, during query optimization that a first database query has a query execution plan comprising a sub-query which executes N times a correlated predicate having an operator being one of equal and not equal to a base column;
    comparing, by the at least one processor, based on the correlated predicate, a cost of creating a hash index and probing the hash index N times to a cost of fully scanning the base column N times;
    creating on-demand, by the at least one processor, a hash index based on the comparing; and
    executing, by the at least one processor, a second database query using the hash index, wherein the executing eliminates fully scanning the base column N times.

2. The method of claim 1, further comprising determining that the cost of creating the hash index and probing the hash index N times is less than fully scanning the base column N times, creating the hash index, and using the hash index during query execution to apply the correlated predicate.

3. The method of claim 2, wherein the database comprises a row level versioned (RLV) store supporting row-level snapshot isolation.

4. The method of claim 3, wherein the hash index is associated with a version of the database in the RLV store.

5. The method of claim 2, wherein the second database query is of a same snapshot of the database, the second database query having a correlated predicate with an operator being one of equal and not equal to the base column.

6. The method of claim 1, wherein the first database query comprises one of a correlated sub-query and a nested loop push down join query.

7. The method of claim 1, further comprising:
determining that the cost of creating the hash index and probing the hash index N times is less than fully scanning the base column N times; and
populating the hash index, the hash index comprising a hash table associating values in a column with rows in a database table version, wherein the hash table comprises:
at least one element being a pair of a pointer to a value in the column and a row specification.

8. The method of claim 7, wherein the row specification comprises one of a rowid, an array of rowids, and a bitmap representing rowids.

9. The method of claim 1, further comprising:
discarding the hash index when it is determined that all database transactions using an associated table version are completed and that at least one version of the table more recent than the associated table version exists.

10. A system for creating a hash index on-demand and reusing the hash index for queries in a database, comprising:
a memory; and
at least one processor coupled to the memory and configured to:
determine during query optimization that a first database query has a query execution plan comprising a sub-query which executes N times a correlated predicate having an operator being one of equal and not equal to a base column;
determine, based on the correlated predicate, a comparison of a cost of creating a hash index and probing the hash index N times to a cost of fully scanning the base column N times;
create on-demand a hash index based on the comparison; and
execute a second database query using the hash index, wherein the execution eliminates fully scanning the base column N times.

11. The system of claim 10, the at least one processor further configured to determine that the cost of creating the hash index and probing the hash index N times is less than fully scanning the base column N times, create the hash index, and use the hash index during query execution to apply the correlated predicate.

12. The system of claim 11, wherein the database comprises a row level versioned (RLV) store supporting row-level snapshot isolation.

13. The system of claim 12, wherein the hash index is associated with a version of the database in the RLV store.

14. The system of claim 11, wherein the second database query is of a same snapshot of the database, the second database query having a correlated predicate with an operator being one of equal and not equal to the base column.

15. The system of claim 10, wherein the first database query comprises one of a correlated sub-query and a nested loop push down join query.

16. The system of claim 10, wherein the at least one processor is further configured to:
determine that the cost of creating the hash index and probing the hash index N times is less than fully scanning the base column N times; and
populate the hash index, the hash index comprising a hash table associating values in a column with rows in a database table version, wherein the hash table comprises:
at least one element being a pair of a pointer to a value in the column and a row specification.

17. The system of claim 16, wherein the row specification comprises one of a rowid, an array of rowids, and a bitmap representing rowids.

18. The system of claim 10, the at least one processor further configured to:
discard the hash index when it is determined that all database transactions using an associated table version are completed and that at least one version of the table more recent than the associated table version exists.

19. A tangible computer-readable device having instructions stored thereon that, when executed by at least one computing device, causes the at least one computing device to perform operations for creating a hash index on-demand and reusing the hash index for queries, the operations comprising:
determining during query optimization that a first database query of a database has a query execution plan comprising a sub-query which executes N times a correlated predicate having an operator being one of equal and not equal to a base column;
comparing, based on the correlated predicate, a cost of creating a hash index and probing the hash index N times to a cost of fully scanning the base column N times;
creating on-demand a hash index based on the comparing; and
executing a second database query using the hash index, wherein the executing eliminates fully scanning the base column N times.

20. The computer-readable device of claim 19, the operations further comprising:
determining that the cost of creating the hash index and probing the hash index N times is less than fully scanning the base column N times, creating the hash index, and using the hash index during query execution to apply the correlated predicate.

* * * * *